(No Model.)

LE G. PARKERTON.
SCREW TAP.

No. 376,342. Patented Jan. 10, 1888.

Witnesses:
J. H. Shumway
Fred C. Earle

Le Grand Parkerton, Inventor
By Atty, John E. Earle

UNITED STATES PATENT OFFICE.

LE GRAND PARKERTON, OF GUILFORD, CONNECTICUT.

SCREW-TAP.

SPECIFICATION forming part of Letters Patent No. 376,342, dated January 10, 1888.

Application filed September 26, 1887. Serial No. 250,666. (No model.)

*To all whom it may concern:*

Be it known that I, LE GRAND PARKERTON, of Guilford, in the county of New Haven and State of Connecticut, have invented a new Improvement in Taps or Reamers; and I do hereby declare the following, when taken in connection with accompanying drawings and the letters of reference marked thereon, to be a full, clear, and exact description of the same, and which said drawings constitute part of this specification, and represent, in—

Figure 1:
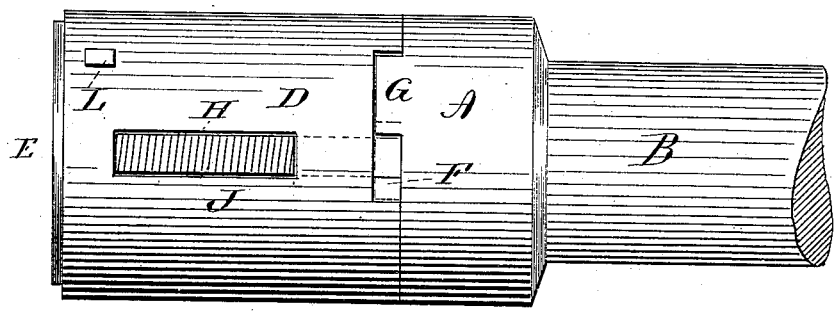
Figure 2:
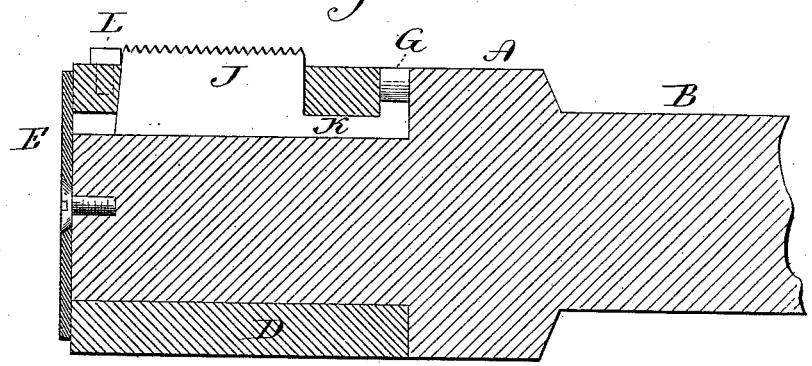
Figure 3:
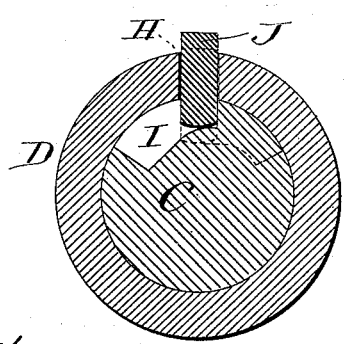
Figure 4:
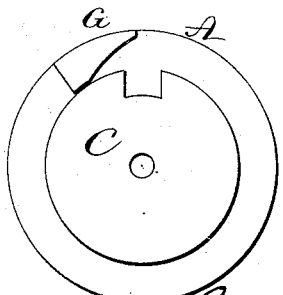
Figure 5:
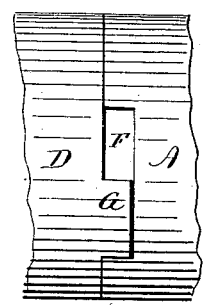

Figure 1, a top view of the tool, showing one cutter; Fig. 2, a longitudinal central section through the cutter; Fig. 3, a transverse section through the cutter; Fig. 4, an end view of the spindle with the sleeve removed, showing the projection or stop G; Fig. 5, a modification.

This invention relates to an improvement in the class of tools which are employed for reaming or tapping holes in metal, and which tool is adapted to be set into the mandrel of a machine in which the article to be reamed or tapped is supported, and in which either the mandrel carrying the tap or reamer or the support for the article revolves—that is, one being stationary, the other revolves. In either case, under the more general construction of this class of tools, the cutter, after having done its work, is withdrawn and necessarily works against the surface which it has cut on the entrance to the detriment of the tool. In some cases the cutting portions of the tool have been made in the form of radial blocks, which are adjustable radially, so as to throw the cutters out for action or draw them inward when the tool is to be withdrawn; but in the more general arrangement of this construction the tool has been thrown outward or drawn inward by hand.

The object of my invention is to so construct the tool that the cutter may be thrown out to work or drawn inward after work automatically by simply the reverse movement in the direction of revolution.

A represents the head of the tool, provided at one end with a suitable shank, B, by which it may be secured to the mandrel, or may be made as a part of the mandrel. On the other or outer end of the head is a longitudinal projecting concentric spindle, C, and around this spindle is a sleeve, D, free for rotation on the spindle, but held against longitudinal movement at one end by the shoulder between the head and spindle, and may be at the other end by a cap, E, fixed to the end of the spindle and projecting onto the end of the sleeve, as seen in Fig. 2. Only a certain amount of rotation is permitted to the sleeve independent of the spindle, and this is produced by making a recess, F, in the head end of the sleeve, and on the head a projection, G, less in extent than the length of the recess F, so that the sleeve may rotate in either direction, but will come to a bearing in one direction against one side of the projection G, and in the opposite direction against the opposite side, as represented in broken lines, Fig. 1.

Longitudinally through the sleeve slots H are cut, in number corresponding to the number of cutters required, here represented as one. In the surface of the spindle inside the sleeve a recess, I, is made of cam shape circumferentially, and so that the depth through the slot from the surface of the sleeve to the surface of the spindle will vary accordingly as the recess I beneath it varies in its relative position thereto—that is to say, standing as seen in Fig. 3, the minimum depth from the surface of the sleeve through the slot to the spindle is represented. Now, if the spindle be turned, say, to the right, as indicated in broken lines, Fig. 3, the depth from the surface of the sleeve inward will increase according to the cam shape of the recess I; but when the spindle is turned in the opposite direction, then the depth through the sleeve correspondingly diminishes.

In the slot H the cutter J is arranged. This cutter corresponds in shape to the slot, so as to fit closely therein, yet permit radial movement of the cutter under the rotation of the spindle outward or inward, according to the direction in which the spindle is turned. This cutter is of a depth so that when standing upon the higher surface of the cam it will project radially from the surface of the sleeve, as indicated in Fig. 3; but when the spindle is turned to bring the greater depth of the recess I below the cutter, then the cutter will drop, as indicated in broken lines, Fig. 3.

The cutter is prevented from escaping from its slot by a longitudinal extension, K, inside the sleeve and by an extension of some character at the other end inside the sleeve. (Represented in Fig. 2 as an under-cut of the end of the slot with a corresponding shape of the end of the cutter.) The extension K reaches to a position inside the projection G on the head, as represented in Fig. 2, and the inner surface of the projection G is made of a shape corresponding to the recess I, as seen in Fig. 4, so that the inner surface of the projection G may act as a cam against the cutter to force it inward when the spindle is turned to permit the cutter to recede.

At the end of the sleeve, and forward of or in advance of the cutter J, a block, L, is applied, which may be a preliminary cutter, but is made stationary, and its projection is sufficient to just engage the surface to be cut, and the projection of the cutter, when thrown outward, is so as to bring the outer surface into the proper cutting position. That outer surface is made corresponding to the cut required. I have represented it as made in the form of a tap for cutting a screw-thread.

The tool is applied to the mandrel and the sleeve turned so as to bring the cutter to the deeper side of the recess I in the spindle, as indicated in broken lines, Fig. 3, and caused to revolve in the usual manner. The metal to be tapped, having a suitable hole first made therein, is brought into line with the tool, so that it may properly enter the hole, and the block L first engages the inner surface of the hole, either as a preliminary cutter or simply by frictional contact, but so as to resist revolution of the sleeve. The mandrel continues its revolution, carrying the spindle, while the sleeve is so arrested, and this arrest of the sleeve continues until the projection G on the head comes against the opposite end of the recess F in the sleeve. During this stand of the sleeve the cam-shaped recess I has caused the cutter to be thrown outward, as indicated in Fig. 3, to bring its surface into proper cutting position. Then the work continues in the usual manner for tapping or reaming, as the case may be. As soon as the tapping has been performed, the direction of revolution is reversed, as in the use of this class of tools the cutter naturally holds against the surface of the hole, so as to resist the turning of the sleeve, yet the spindle will turn in the reverse direction, bringing the deeper portion of the recess beneath the cutter, when the cutter will be permitted to recede, and it is forced so to do by the cam-shaped inner surface of the projection G acting upon the inner end of the cutter. Thus, when the tool is advanced to commence its work, the cutter is automatically thrown out to its cutting position, and there supported by the spindle; but immediately upon reversing the direction of revolution the cutter is thrown inward into the contracted position, and so that it may be drawn from the hole without contact with the surface; but if the block L retains its contact with the inner surface of the hole it will on the reverse revolution cause the sleeve to stand as it did on entering and until the spindle has turned so far as to draw the cutters to their inward position.

Different cutters may be interchangeable one with another, so that the same spindle and sleeve will answer for various diameters of cutter or various pitches of thread.

In some cases the tool is held stationary while the metal to be reamed or tapped revolves; but the result is the same. The block L serves to make engagement as the tool enters the hole and produces the stand or revolution of the sleeve, as the case may be, which will cause the cutter or cutters to be thrown outward, and immediately upon the reverse direction of revolution the reverse action between the sleeve and spindle will occur and the cutter immediately be drawn inward out of contact with the surface.

It will be understood that if more than one cutter is required and the cam-shaped surfaces and slots are made accordingly in the sleeve D, there must be a cam-shaped surface on the spindle corresponding to the under surface of the projection G to draw the cutters inward and hold them in their inward position.

The block L may be removable, as represented in Fig. 2, the blocks prepared to be interchangeable according to the projection required for the cutters or the engagement of the surface of the hole.

Instead of making the stop between the spindle and sleeve by projection on the head into a recess on the sleeve, this order may be reversed and the projection made on the sleeve and recess on the spindle, as seen in Fig. 5.

I claim—

1. The combination of the spindle C, having one or more longitudinal cam-shaped recesses, I, formed in its surface, the sleeve D, surrounding said spindle, having one or more longitudinal slots, H, therein corresponding to the said cam-shaped recesses I in the spindle, with a stop between the said spindle and sleeve, whereby a partial rotation of said spindle independent of the sleeve may be permitted, one or more cutters set radially through the slots in the sleeve, so as to rest in the said cam-shaped recesses I on the spindle, with a block, L, on the sleeve in advance of the cutter, substantially as and for the purpose described.

2. The combination of the spindle C, constructed with longitudinal cam-shaped recess I in its surface, a sleeve, D, surrounding said spindle, said sleeve constructed with a longitudinal slot, H, corresponding to said cam-shaped recess I in the spindle, the sleeve also constructed with a circumferential recess, F, at its inner end, and the spindle portion constructed with a corresponding projection, G, less in extent than the length of the said recess F, whereby a partial rotation of the spindle independent of the sleeve is permitted, the said projection G being outside the cam-shaped recess in the spindle and its under surface of corresponding cam shape, the cutter J, arranged in said slot in the sleeve so as to rest in the cam-shaped recess I in the spindle, with an extension therefrom beneath said projection G, and a block, L, on said sleeve in advance of the cutter, substantially as described.

LE GRAND PARKERTON.

Witnesses:
   CHAS. H. POST,
   GEO. N. BRADLEY.